US012802108B2

(12) United States Patent
Wang et al.

(10) Patent No.: US 12,802,108 B2
(45) Date of Patent: Nov. 17, 2026

(54) AUTOMATIC PUBLICATION METHOD OF STORE PRODUCTS AND SYSTEM

(71) Applicant: SHENZHEN MEIYUNJI NETWORK TECHNOLOGY CO., LTD, ShenZhen (CN)

(72) Inventors: Zhichao Wang, ShenZhen (CN); Zhijie Yang, ShenZhen (CN); Songhui Mei, ShenZhen (CN); Feng Zeng, ShenZhen (CN); Zhen Wang, ShenZhen (CN); Shoubao Chen, ShenZhen (CN)

(73) Assignee: SHENZHEN MEIYUNJI NETWORK TECHNOLOGY CO., LTD, ShenZhen (CN)

( * ) Notice: Subject to any disclaimer, the term of this patent is extended or adjusted under 35 U.S.C. 154(b) by 238 days.

(21) Appl. No.: 18/754,183

(22) Filed: Jun. 26, 2024

(65) Prior Publication Data

US 2025/0013709 A1 Jan. 9, 2025

(30) Foreign Application Priority Data

Jul. 3, 2023 (CN) ........................ 202310808210.2

(51) Int. Cl.
*G06Q 30/0601* (2023.01)
*G06F 40/186* (2020.01)

(52) U.S. Cl.
CPC ....... *G06Q 30/0601* (2013.01); *G06F 40/186* (2020.01); *G06Q 30/06031* (2025.08); *G06Q 30/0603* (2013.01)

(58) Field of Classification Search
None
See application file for complete search history.

(56) References Cited

U.S. PATENT DOCUMENTS

| | | | | |
|---|---|---|---|---|
| 8,489,603 | B1 * | 7/2013 | Weissgerber | G06F 16/285 707/804 |
| 2017/0372407 | A1 * | 12/2017 | Konigsberg | G06F 40/40 |
| 2018/0052913 | A1 * | 2/2018 | Gaskill | G06F 16/3344 |
| 2020/0082468 | A1 * | 3/2020 | Grove | G06Q 30/06 |
| 2024/0037497 | A1 * | 2/2024 | Brown | G06Q 30/012 |
| 2024/0070724 | A1 * | 2/2024 | Nagar | G06Q 30/0253 |

* cited by examiner

*Primary Examiner* — Linda Huynh
(74) *Attorney, Agent, or Firm* — Maier & Maier, PLLC

(57) ABSTRACT

An automatic publication method of store products and a system, which includes collecting information of the to-be-published product from the source platform; selecting a target store for publishing the products and setting product publication rules of the target store; pre-establishing a product classification library, which calculates the classification for the to-be-published product, thereby obtaining the product publication classification and product release attribute information to identify the required release item or optional release item for the publication information; filling in the product source information to the publication information according to the publication rules; calling the AI system to fill in the required release item for the missing information; posting the completed publication information in the target store. Embodiments can improve the work efficiency of product publication, and accuracy of product information creation in the process of product publication, and realize product publication from any source platform to any other platform.

8 Claims, 5 Drawing Sheets

AUTOMATIC PUBLICATION METHOD OF STORE PRODUCTS AND SYSTEM

TECHNICAL FIELD

The present application relates to the field of computer technology, and in particular relates to an automatic publication method of store products and a method of converting multi-platform products information, and the systems corresponding to each method.

BACKGROUND

With the rise of global e-commerce, international retail trade has been developing rapidly, and a large number of domestic small and medium-sized e-commerce sellers have expanded their retail business to foreign markets. Along with the development of cross-border business, the e-commerce ERP system developed based on ERP software (referred to as e-commerce ERP) has gradually developed. ERP can be deeply connected with the e-commerce platform to help domestic small and medium-sized e-commerce sellers to unify the management of their overseas stores, solve the obstacles brought by language differences, and realize the management of hundreds of e-commerce stores by a single operator at the same time, which greatly improves the efficiency of store operations.

E-commerce ERP is through the established rules to access and control the e-commerce platform stores, dealing with store operations in all aspects of dynamic data. The system not only has the complicated data management, but also needs to meet the demands of many types of users (sellers) to operate easily. The functional algorithms and rules formulated by each software company in the development of e-commerce ERP are also basically different, and its various functional modules will continue to develop new versions with the changing needs of users in order to be compatible with more usage scenarios.

When the existing e-commerce ERP publishes products to the target store of the corresponding e-commerce platform, the store operators need to manually create the product information in the product editing page of the target store and then publish (referred to as manual publishing); or collect the corresponding product information from the source platform through the collection tool, then import the collected product information to the product editing page of the target store and then manually proofread, correct and translate the collected product information (referred to as auxiliary publishing). These two methods of product publication require a lot of time and effort from store operators, which makes the product publication work inefficient and requires high professional ability from the operators. The target store refers to the store used to publish the to-be-published product, and the publication platform refers to the e-commerce platform where the target store is located.

For the auxiliary publishing method, the relevant technology categorizes the product information collected from the source platform (referred to as the source product information) according to the classifications of product price information, product title information, product picture information, product description information and so on, and then adopts the required corresponding filling method to fill the categorized product information into the product editing page of the target store. Since there are great differences between the sourcing platform and the publishing platform in the language type of the product information and the classification standard of the product information (including the name of the classification and the number of classifications), when filling the source information into the product editing page of the target store, the data mismatch of the product information will lead to the filling of the content error, missing and other abnormalities, which will increase the workload of manual proofreading, correction and translation, resulting in a significant reduction in the efficiency of the product publishing work. The work efficiency of product release is greatly reduced.

In addition, because the classification standards for product information of different source platforms and different publishing platforms differ greatly, it can not realize data conversion of product information of any source platform and product information of any publishing platform, or conversion of product information between any publishing platforms.

Other technical issues involving the present application are further elaborated later. The above content is only used to assist in understanding the technical solutions of this application, and does not mean that all of the above content is prior art.

SUMMARY

The main purpose of the present application is to provide an automatic publication method of store products and system, to improve the efficiency of products publication and the accuracy of creating product information in the product publishing process. In addition, the present application provides a multi-platform product information conversion method and system to realize data conversion of product information of any source platform and product information of any platform.

In order to realize the above purposes, the present application proposes an automatic publication method of store products, which is used for the product module of an e-commerce ERP or an e-commerce platform, the product module includes a product classification management module and a creation assistant tool module, the product classification management module includes a classification prediction tool, and the creation assistant tool module connects with an external AI system, wherein the method includes:

- step K1: collects product information of the to-be-published product from the source platform, and defines the collected product information as source information;
- step K2: selects the target store for publishing the product, defines the product information to be filled in the target store at the time of product publication as the publication information, and defines the e-commerce platform where the target store is located as the publication platform; sets the product publication rule for the target store;
- step K3: pre-sets a product classification library in the product classification management module, the classification prediction tool performs product classification calculation of the to-be-published product based on source information, to obtain the product publication classification of the to-be-published product from the product classification library; further obtains the product release attribute information of the to-be-published product based on the product publication classification; sets the to-be-filled items of publication information and identifies each of the to-be-filled items as required release item or optional release item;
- step K4: extracts the product information from the source information with the same information classification as the to-be-filled items in the product publication information, and then process accordingly the extracted source information according to the product publication rule, and then fills the processed source information into the to-be-filled items of the corresponding publication information;

step K5: determines whether there is missing information in the required release item of the publication information, when there is no missing information in the required release item, performs the operation of the step K6; when there is missing information in the required release item, the creation assistant tool module generates a benchmark question based on the publication name of the missing required release item, and then inputs benchmark question as a questioning information to the AI system, after the AI system generates the corresponding product information according to the questioning information, fills the product information generated by AI system into the corresponding required release item where there is a missing information;

step K6: publicates the completed publication information into the target store.

The present application (embodiment) relates to the technology of the AI system and the approximation of the technology used in the later method for generating store information, which is set forth in the detailed description (specific embodiment). Other technical features and technical effects of the present application are set forth and described in later parts of the specification. The technical problem-solving ideas and related product design solutions of this application are:

In order to improve the efficiency of product publication, it is necessary to improve the matching accuracy between the product information collected from the source platform (referred to as the source product information) and the product information to be filled in the product editing page of the target store (referred to as the publication information). The preliminary solution is to preset the corresponding product publication template according to the information classification of each item to be filled in the product editing page of the target store, and then identify the content of the source information one by one according to each item to be filled in the product publication template, extract the source information with the same information classification as the item to be filled in the product release template, and then finally fill the completed item as the release information, and finally fill the completed item as the release information. Finally, the completed items to be filled in will be published to the target store as the publication information. This method of product publication through template recognition can improve the accuracy and speed of matching the source information and publication information, and reduce the workload of manual proofreading, but since the template for product publication is set up according to a single e-commerce platform, the items to be filled in the template and the source information cannot be completely corresponded to each other, so that only the product information with the same classification of the template's to be filled in can be recognized, and the product information of similar and different classifications cannot be recognized, thus resulting in the failure of the template to recognize the source information. For similar classifications and different classifications of product information cannot be recognized, resulting in the publication of information in many to be filled items will be missing information.

In addition, since the to-be-published product may originate from different source platforms and may be published to the target stores of different platforms, and since the classification standards of the source information of the various source platforms are not consistent, and the classification standards of the release information of the various release platforms are not consistent, it is difficult to realize that the release of the source information captured from any source platform is published to the target stores of any platform. Therefore, based on the current state of the art of the product information processing method, this template-recognized product release method is only suitable for products with simple product attributes, and is only suitable for releasing the source information collected from a single sourcing platform to a target store on a single publication platform, and the scope of application is very narrow.

On this basis, it is necessary to further solve the problem of data matching between the source information of multiple source platforms and the publication information of multiple target platforms.

First, the source information collected from the source platform is pre-processed and split into initial classifications of source information such as product title information, product price information, product picture information and product description information. The product description information is initially corresponded to each publishing platform. Specifically, the product description information is divided into two classifications of simple product description information and detailed product description information according to different e-commerce platforms, in which the simple product description information mainly records product attribute information (product attribute information refers to the product information in the product description information with the name of a specific product attribute and the corresponding content of the product attribute), and contains only textual information, which is used to correspond to Wish, Amazon, Shopee, Joom and other parts of the e-commerce platform (publication platform) of the product description part. Detailed product description information records product attribute information and other product description information outside the product attribute information (e.g., product detail picture, product function introduction, company information, after-sale service information, etc.), containing text, picture and video information, which is used to correspond to the information of another part of e-commerce platforms (publishing platforms), such as AliExpress, eBay, Lazada, Shopify and so on.

In addition, the product price information records information about the variants of the product, including the variant name, variant specification, variant picture, variant price, stock quantity, size, weight, SKU and other information of each variant. Product picture information records information such as panoramic picture, application picture, and product video of the product, and can also record the variant picture or picture information in the description of the product. Product picture information is used to store the pictures and videos of the product and to identify the usage of each picture and video. Product title information records the title of the to-be-published product.

Further, a product classification management module is set up on the product module of the e-commerce ERP system, and a classification prediction tool and a product classification library are further set up on the product classification management module, and a product classification calculation is carried out on the collected to-be-published product by the classification prediction tool in order to obtain a product release classification (product publication classification) of the to-be-published products from the product classification library. Specifically, the total product classification library is pre-set on the product classification management module, and the product classification library integrates the product classifications of each publication platform and the product classifications created in the e-commerce ERP into a collection of product classifications that is independent of each e-commerce platform (i.e., constructs new product classification rules). Define the product classifications at each level in the product classification library as product publication classifications. When setting the product publication classification, make the product publication classification and the product classification of each publication platform the same, or the product publication classification can be attributed to the product classification of each publication platform, so as to ensure that each product publication classification under the product classification library can correspond to the product classification of each platform. At the same time, the corresponding product attribute items are preconfigured on the basis of the product publication classification, and the product publication attribute information of each product publication classification contains multiple product attribute items, so as to reduce the minimum granularity of the product release (publish) attribute information, and obtain a more accurate setting range of the product publication attribute. Each product attribute item includes a product attribute name and a product attribute content. Specifically, a corresponding product attribute template is configured for each product publication classification, and each product attribute template is configured with a corresponding plurality of product attribute items. In addition, the product information to be filled in the product editing page is labeled as a required release item or an optional release item according to the degree of importance. Accordingly, the product attribute items are further labeled as required attribute items or optional attribute items according to the degree of importance of each product attribute item. Each required item is preset with a default value, which can be empty or a regular value, for example, the default value of the required material item is "Regular Material", and the default value of the required size item is "Regular Size". There is also an attribute proofreading management module on the product module.

After selecting the target store of the corresponding e-commerce platform, the classification prediction tool calculates the product classification of the to-be-published product based on the collected sourcing information to calculate the product publication classification of the to-be-published product from the product classification library. Then, the attribute proofreading management module further obtains the corresponding attribute information of the to-be-published product according to the product publication classification of the to-be-published product. By configuring the corresponding product publication attribute information on the basis of each product publication classification, more accurate product attribute items can be obtained, so as to facilitate the calibration of the required release item or the optional release item by the AI system at a later stage. In addition, the product publication classification and product attribute items can be used to clean the source information and remove the product information that is not related to the product publication classification and product attribute items.

Further, the product publication rules of the target store are set, and processing operations such as price adjustment processing of product price information, merging processing of product attributes, and generating new SKU is carried out through the product publication rules, so that the source information is automatically converted into the corresponding release information in accordance with the predetermined trademark publication rules, improving the efficiency of the product information creation.

Then, the creation assistant tool module is used to call the AI system to further improve the content of the required release item. That is, first determine whether there is a lack of information in the required release items in the publication information, when there is a lack of information in the required release items, generate a benchmark question through the publication name of the required release items with a lack of information, input the benchmark question as a question message to the AI system to generate the corresponding product information, and then backfill the generated product information into the corresponding required release items with a lack of information. Fill the missing required items one by one, so that all the required items are filled in completely, avoiding the mismatch between the source information and the publication information that leads to the interruption of the automatic product publication, and also improving the speed and accuracy of the creation of the publication information. In addition, using the creation assistant tool module to automatically create other benchmark issues, you can also touch up the filled release information to generate publication information that is better than the source information.

After all the required release item are filled in, each publication information is translated into the language of the target store, and then the publication information in the product module is published to the target store to realize the automatic product publication.

This automatic publication method of store product can realize the data matching between the product information of any source platform and the product information of any publication platform, and is able to publish product with complex attributes, with a wide range of applications; in the process of publishing product information, the stages of collection, classification, matching, conversion, information generation and so on can be realized automatically, which substantially improves the speed and accuracy of the creation of the product information, which in turn significantly improves the efficiency of store product release. This significantly improves the speed and accuracy of the creation of product information, which in turn significantly improves the efficiency of the store's product publication. In addition, it can enable the source information to be quickly and accurately converted into publication information, and the created publication information is better than the original source information of the source platform; it can be used for store moving and shorten the time of store moving, improve the efficiency of moving the store from one e-commerce platform to another e-commerce platform, and reduce the difficulty of store operation, as well as reduce the professionalism requirements of the store operation personnel. In addition, as a result of substantially plus shortening the time of product publication as well as solving the problem of matching product data between any source platform and any e-commerce platform, it is possible to realize the batch publication of products and the trial sale of products to improve the efficiency of the verification of the selection of products; and it is possible to quickly publish explosive products and seize the selling time of explosive products to help sellers to rapidly increase the sales volume of the store. Other implementation programs and technical effects are described later.

On the basis of the above technical solution, the present application also provides a multi-platform product information conversion method for a product module of an e-commerce ERP or e-commerce platform to convert product information of any source platform (the first platform) to publication information of any publication platform (the second platform), the multi-platform product information conversion method comprising steps Q1-Q5:

step Q1: selects the sourcing platform and obtains the sourcing product information of product A from the sourcing platform, and splits the sourcing information into initial classification sourcing information; wherein the initial classification source information includes product title information, product price information, product picture information, and product description information, wherein the description information includes simple product description information and detailed product description information;

step Q2: selects the publication platform, set the product publication rule of the publication platform;

step Q3: sets the product classification manage module on the product module, the product classification manage module includes the product classification library, which will pre-set the product publication classification, and each classification is preconfigured with the corresponding product attribute items; according to the source information to obtain the product publication classification and product attribute information of product A, set the items to be filled in for publication information, and mark the items to be filled in as required release item or optional release item;

step Q4: converts the source information to the corresponding publication information according to the product publication rule, and populates the converted publication information into the to-be-filled items of the corresponding publication information;

step Q5: determines whether there is missing information in the required release item in the publication information, and completes the conversion operation of product information when there is no missing information in the required release item, when there is missing information in the required release item, the creation assistant tool module generates a benchmark question based on the publication name of the missing required release item, and then inputs the benchmark question as questioning information to the AI system, and after the AI system generates the corresponding product information according to the questioning information, then fills the AI system-generated product information into the corresponding required release item where there is a missing information, after all the required release items with missing information are filled, completes the conversion operation of the product information.

This multi-platform product information conversion method can realize data (information) conversion of product information of any source platform and product information of any publication platform; in addition to being used for product publication, it can also be used for storing source information, store moving and other operations to improve the matching accuracy of product information and the efficiency of information conversion. Other implementation programs and technical effects are described later.

Further, the present application also provides a system, the system comprising a functional module such as the product module, sales module, purchasing module, logistics module, warehouse module, financial module, advertising module, customer service module, or tool module, and executing various operation instructions of the corresponding functional module. Accordingly, the present application also provides a server, the server comprising the memory and processor. Each functional module and its system in the present application being stored in the memory, and the processor executing each operation instruction of the corresponding functional module and its system. In addition, the present application also provides a computer device, which includes the memory and processor, each functional module of the present application and its system is stored in the memory, and the processor can execute each operation instruction of the corresponding functional module and its system.

Disclaimer: The content of the questions asked to the AI system in this application can be to raise requirements or questions. Referring to FIG. 3, the e-commerce ERP system of the present application includes one or more of functional modules such as product module, sales module, purchasing module, logistics module, warehouse module, financial module, advertisement module, customer service module, tool module, permission manage module, and data module. The functional modules of the present application may be fused with each other, or exist independently of each other, or one functional module may act as another submodule of another functional module. Each functional module of the present application may be set up on an e-commerce platform for managing stores on the corresponding e-commerce platform. The operators of the e-commerce ERP of the present application may also be referred to as store managers, sellers, merchants, operators, users, customer service staff, or questioners (questioners of the AI system), and their identities are not strictly limited unless specifically stated. In this application, "products" and "goods" are both customary terms in this field, and they have the same meaning without distinction. In this application, "e-commerce platform" is short for "e-commerce platform system".

Meanings and descriptions of terms used in this application in the field of e-commerce (the letters of the English words in this application are not case sensitive):

(1) ERP is Enterprise Resource Planning, which can also be used as an abbreviation for ERP system in this application.

(2) AI means Artificial Intelligence.

(3) Product title information is textual information used to briefly describe the product, usually in one sentence.

(4) Product description information refers to the product information used to introduce the detailed characteristics of the product, which can be text, pictures, videos, charts and other information.

(5) Product picture information refers to the picture information used to display the shape, structure, color and other contents of the product, and may include one or more product pictures.

(6) Keywords are associated words used to match the same or similar categories of products in searches and queries.

(7) The variant is the variation of a product derived from a change in specification parameters.

(8) Product price information means product price information of the product under the corresponding specification and purchase method.

(9) ASIN is Amazon standard identification number, which in this application may refer to the product number of the e-commerce platform in general; SKU (Stock Keeping Unit) refers to the stock product code, which refers to the goods indicated by the product number in general; SPU refers to the standardized product unit; MSKU (Merchant Stock Keeping Unit) refers to the active product code.

BRIEF DESCRIPTION OF THE DRAWINGS

The accompanying drawings are used to provide a further understanding of the present application and do not constitute a limitation of the present application; the contents shown in the accompanying drawings may be real data of the embodiments and fall within the scope of protection of the present application.

DETAILED DESCRIPTION

Figure 1:
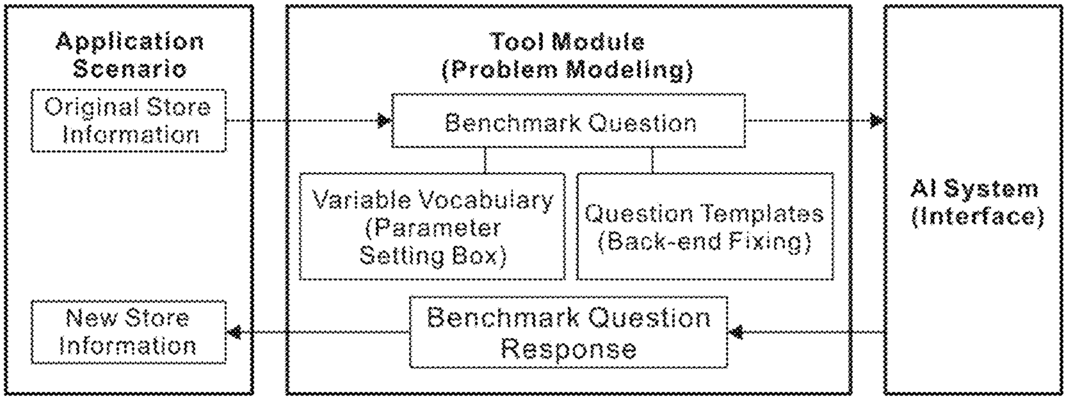
FIG. 1 shows a schematic diagram of the principle of the store information generation method in an embodiment of the present application.

In order to make the purpose, technical solutions and advantages of the present application more clearly understood, the following embodiments of the present application are described in further detail by way of specific embodiments in conjunction with the accompanying drawings. It should be understood that the specific embodiments described herein are only for the purpose of explaining the present application and are not intended to limit the present application.

The present application proposes a method and system for generating store information to improve the efficiency of creating store information and optimize the textual description of store information, with the following solution ideas and design solutions:

In order to improve the accuracy of the creation of product store information, it is necessary to expand new words beyond the original store information in the corresponding scene, and organize the new words and the original store information into a natural language that can match the specific scene. With the development of AI (Artificial Intelligence) technology, the degree of intelligence of AI systems has been greatly improved, for example, ChatGPT, a chatbot program developed by the U.S. company OpenAI, can learn on its own and output high-quality natural language replies based on the questions asked in the conversation, and the responding language usually contains many new words other than those used in the conversation questions. However, because ChatGPT itself has not specialized in learning specific scenarios in the field of e-commerce, ChatGPT cannot know the real intention of the questioner through simple e-commerce questions. As a result, when ChatGPT is directly applied to the creation of store information in the e-commerce field, the accuracy of its output store information is very low and cannot meet the requirements for use.

To this end, we set up a question model on the tool module of the e-commerce ERP system based on the original store information in specific application scenarios (the original store information is incomplete, usually only a small amount of basic data). The question model connects to an external AI system, and the question model improves the way of asking questions to the AI system (ChatGPT or other intelligent systems) to improve the AI system's output of the response information to improve its accuracy. accuracy to obtain more accurate store information. The AI system is a robot based on instruction fine-tuning, human feedback reinforcement learning, and uses a natural language generation model (described later). When improving the questioning method to the AI system, a variety of questioning methods are set up in advance according to the application scenario, and the accuracy of the information output from the AI system is compared with that of each questioning method, so that the questioning method with higher accuracy is selected as the benchmark question of the question model, or the questioning method with higher accuracy can be improved (e.g., by adding other constraints or by changing some of the original constraints) in order to obtain a new benchmark question, thus obtaining a pre-validated benchmark question. In other words, the pre-validated question model is set up in the tool module of the e-commerce ERP system to improve the accuracy of the output information of the AI system.

Further, the benchmark question of the question model is split into a question template and a variable vocabulary. The question template, as the framework of the question language, is set at the back end of the software, is the main structure of the benchmark question, and is also the fixed language part of the benchmark question, which is used to qualify the response direction of the question from multiple dimensions, including the constraint terms used to qualify the question requirements and application scenarios. That is, the content of the question template includes application scenario terms, requirement terms, and other fixed constraint terms (e.g., additional qualifiers, punctuation, grammatical structures, etc.). The variable vocabulary is the variable language part of the benchmark question, which is reserved for the user to further set the corresponding content to limit or constrain the scope of the response to the question; the variable vocabulary can be set in the front-end of the software, and the user (the questioner) can set its content. The variable vocabulary can be set by typing in the corresponding content, selecting the corresponding content from the predefined options, or obtaining the relevant information content from the original store information, and the content of the variable vocabulary can be a single word, multiple words, a sentence, a paragraph, or a multi-paragraph description of the text.

For example, a certain benchmark question A is "I wish to publish a product of [xx classification], the original title is [xxxxx], other key information has [xx\xx\xxx], help me write 5 optimized [English] product titles with the number of characters between 98-128." Among them, the textual content inside the middle bracket is the variable vocabulary, which is used to limit and narrow down the scope of the AI system's response, [xx classification] can get the classification of the store's goods, the key information [xx\xx\xxx] can be obtained by manually inputting one or more keywords by the user, and [English] can be inputted by the user or by choosing the pre-translated target language; the textual content outside the middle bracket serves as the question template, and the question The question template can be used to link the vocabulary of each variable, but also provide other supplementary qualifiers, such as "the number of characters between 98-128", which can greatly simplify the user's operational level of questioning by centralizing multiple types of constraints (associated or unassociated) in the question template. In order to facilitate identification and simplify the expression, the variable vocabulary of this application is marked with brackets, and other expressions can be used in practical application.

In other words, question templates and variable vocabularies are used to split the questioner's intent into fixed and variable constraints to compensate for the questioner's difficulty in expressing his or her true intent quickly, completely, and accurately. Splitting benchmark questions into question templates and variable vocabularies can simplify questioning and reduce the number of questions by combining multiple similar questions into a benchmark question with a consistent format; and users can set only a small number of variable vocabularies to generate a complete benchmark question, which can automatically connect to the AI system to output accurate response language, i.e., to generate new store information.

In practical application, when the user sets the corresponding variable vocabulary based on the original store information (e.g., the original title of the product, the product classification, the product attributes, the customer service information, the customer service email, and other information), the question model automatically generates a benchmark question composed of the question template and the corresponding variable vocabulary. The tool module inputs the benchmark question as question information to the AI system, the AI system outputs the corresponding response content according to question information, and the tool module obtains the response content output by the AI system. The response content output by the AI system is then used as the new store information, or one of the response solutions is selected as the new store information when the AI system outputs a plurality of response solutions.

This method of generating store information does not require the AI system to learn the specific scenes in the field of e-commerce, nor does it require the user to invest a lot of mental labor for language conception, the user only needs to set a small number of variable vocabulary, and then can quickly get new store information, which greatly improves the efficiency of creating store information, and the language is natural, accurate, and matches a variety of application scenarios. The operation is flexible, simple, and low-difficulty, and users can freely choose to set the corresponding variable vocabulary, which makes the generated new store information rich and diverse and meets the personalized needs. On the other hand, setting the problem model on the tool module of the e-commerce ERP system or the e-commerce platform system not only allows the original store information to be obtained when setting the variable vocabulary, but also makes use of the large number of users of the e-commerce ERP system or the e-commerce platform system to further validate and calibrate the corresponding problem template through the monitoring of the results of millions of operations, and continually improves the problem model and its benchmark questions. Other implementation programs and technical effects are described later.

Figure 2:
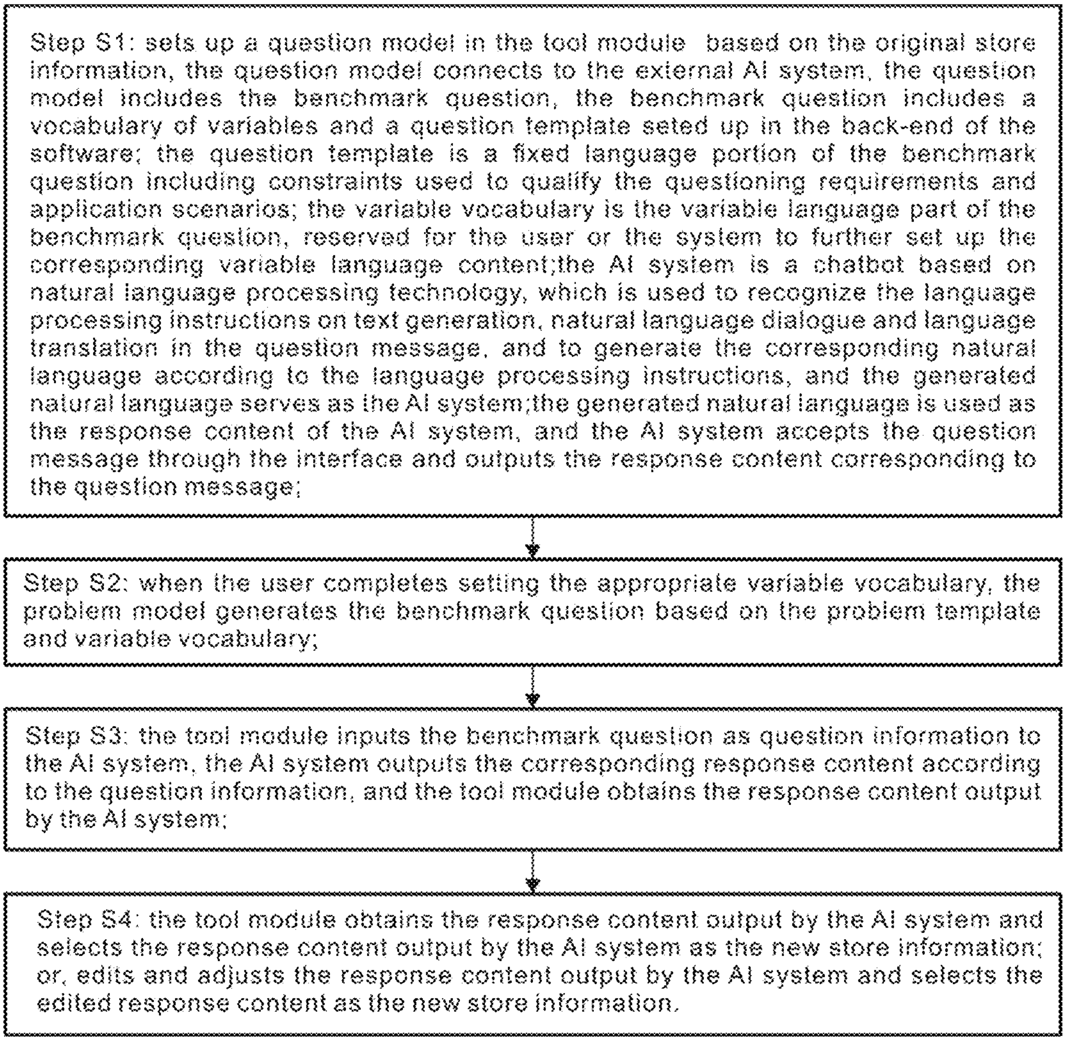
FIG. 2 shows a schematic diagram of the flow of the store information generation method in an embodiment of the present application.

Specifically, as shown in FIGS. 1 and 2, the present application proposes a store information generation method for use in a tool module of an e-commerce ERP system or an e-commerce platform system, in one embodiment of the present application, the replenishment method comprises steps S1-S4 as follows.

Step S1: setting up a question model on the tool module based on the original store information, question model connecting to an external AI system (which may be an AI system connected via the Internet), question model comprising a benchmark question (the accuracy of which has been pre-verified), benchmark question comprising a variable vocabulary and a question template set at the back-end of the software or the front-end of the software, question template being the benchmark question's fixed language portion of the benchmark question, including constraint terms (which may also include one or more other constraint terms) used to qualify the questioning requirements (i.e., the purpose of the questioning) and the application scenarios, and variable vocabulary is the variable language portion of the benchmark question, reserved for the user or the system to further set up the corresponding variable language content. The setting of the variable vocabulary can be set manually by the user or the software system can automatically obtain the relevant field information (e.g., buyer's message, customer's complaint, etc.) according to the rules, which can be set in the front-end or back-end of the software. When the variable vocabulary is the software system automatically obtains the relevant information, the variable vocabulary can also be set in the back-end of the software. The constraint terms of the question template can be the same words to qualify the questioning requirements and application scenarios at the same time, or different words to qualify the questioning requirements and application scenarios respectively, or the constraint terms of the question template can only make basic descriptions of the questioning requirements and application scenarios, and then combine with the contents of the variable vocabulary to reflect the information of the questioning requirements and application scenarios.

In this application, the constraint term of the benchmark question refers to the language that can guide the AI system to output the response content related to the purpose of the constraint, and not all of the constraint terms are directly limited to the purpose of the constraint, but can be the language that combines with the content of the benchmark question to embody the purpose of the constraint except for the constraint term. For example, in the first constraint in a case A, the constraint language is "you are a helpful assistant", which does not directly limit the questioning needs and application scenarios, but the constraint language combined with the second and third constraints can know the corresponding questioning needs and application scenarios. In other embodiments, the constraints for questioning needs and application scenarios can be set in the variable vocabulary; or one of the constraints for questioning needs and application scenarios can be set in the question template and the other in the variable vocabulary.

The AI system can be a linguistic dialog chatbot (e.g., ChatGPT), a robot based on instruction fine-tuning and human feedback reinforcement learning. Specifically, the AI system is a chatbot based on deep learning and natural language processing technology, which uses a natural language generation model, and is trained on a large-scale text corpus in order to achieve a variety of natural language processing tasks, such as text generation, natural language dialog, and machine translation. That is, the language model of the AI system has corresponding language processing modules for text generation, natural language dialog, machine translation, etc., and is pre-trained with the large-scale text corpus so that it can recognize language processing instructions on text generation, natural language dialog, and language translation in the questioning message, and generate corresponding natural language according to language processing instructions, and the generated natural language serves as the AI The generated natural language is used as the response content of the AI system.

On the architecture of the AI system, a combination of supervised learning and reinforcement learning is used to optimize the natural language generation model, so that the AI system can be further tuned through human feedback on the basis of large-scale unsupervised training, so that its AI system can generate text more accurately, naturally and coherently. At the same time, the AI system is configured with an interface that can connect to external language data (such as text, images, videos and other information data), and provides trained model parameters to the outside world through the open-source platform; that is, the AI system can receive external questioning information (questioning questions) through the interface and output the response content corresponding to the questioning information (questioning questions).

In specific application scenarios, the response content corresponding to the question information output by the AI system through the interface is poorly matched with the actual scenario, and needs to be further calibrated by the question model of the tool module of the e-commerce ERP system or e-commerce platform system.

Step S2: when the user completes setting the corresponding variable vocabulary based on the original store information, the question model generates the benchmark question based on the question template and variable vocabulary. The benchmark question can be generated after clicking the Enter button or directly. It can be understood that the question template and variable vocabulary form the benchmark question.

Step S3: after clicking the AI generation key, the tool module inputs the benchmark question as questioning information to the AI system, the AI system outputs a corresponding response content based on questioning information, and the tool module obtains the response content output by the AI system. The questioning information is input to the AI system based on the question through the interface of the AI system, i.e., the benchmark question is converted into a programming language of the corresponding format according to the formatting requirements of the interface of the AI system, so as to facilitate the AI system to fully recognize the benchmark question.

Step S4: the response content output by the AI system is selected as the new store information; alternatively, the response content output by the AI system is edited and adjusted (to correct or add part of the information), and the edited response content is selected as the new store information. The editing adjustment can be to further analyze the response content output by the AI system so that the response content can be better displayed in the front-end interface of the system, such as deleting part of the punctuation marks to make the response content more reasonable in formatting, and splitting the response content so that it can be displayed in the front-end interface in an unused position. Editing adjustments can also be made by users to manually modify the output of the AI system, such as adding or deleting part of the content information, combining the automatic generation of the system and the user's manual editing of the two types of information generation methods, so that the operation is more flexible and convenient. In addition, when the response content output by the AI system contains multiple response options, one of the response options is selected as the new store information.

For application scenarios that require more stringent language precision, the benchmark question composed by the AI system based on the aforementioned constraint phrases (constraint phrases of the questioning requirement and the application scenario) still fails to generate a response content that meets the requirements. Therefore, in step S1, the question template also includes a target format constraint term, which is used to guide the AI system to output (return) a response content with a target format, so as to automatically filter some text unrelated to the target answer, facilitate the AI system to analyze the questioning intent and output the corresponding format of the linguistic content in accordance with the questioning intent, and further improve the accuracy of the response content; and also enable the AI system to respond to the benchmark question with the same question template with different variables and vocabularies. It also makes the AI system's responses to benchmark questions with the same question template and different variable vocabularies more stable. For example, the AI system is required to: refer to the original title of the context, the number of characters between 98-128, the format of the title of the products in Chinese and so on.

In an embodiment, the question model may be pre-provided with a plurality of benchmark questions and a plurality of parameter setting boxes for setting variable vocabularies, and at least a portion of parameter setting boxes may be selected to set contents or not. The plurality of benchmark questions correspond to different types of parameter setting boxes for setting scenarios respectively, and when the user sets a certain variable vocabulary or a plurality of variable vocabularies, the question model automatically matches the variable vocabulary based on the type of the variable vocabulary setting with the corresponding unique benchmark question, which unique benchmark question is used for the questioning question of this access to the AI system (i.e., input to the AI system). For example, the question model has two variable vocabularies (A1 and A2) and three benchmark questions (B1, B2, and B3), and when A1 sets the content and A2 does not set the content, the question model matches the corresponding benchmark question B1; when A1 does not set the content and A2 sets the content, the question model matches the corresponding benchmark question B2; when A1 sets the content and A2 sets the content, the question model matches the Thus, when the user creates new store information, the user only needs to choose to set a small number of variable words, and does not need to consider how to formulate the question, and does not need to consider how many questions to ask, which significantly reduces the difficulty of creating store information. In a related embodiment, one or more items in the parameter setting box may be limited to be required in order to improve the accuracy of the questioning and reduce the number of preset benchmark questions in the question model.

In related embodiments, the type of the original store information and the type of the new store information are the same. For example, when the original store information is a title, the generated new store information is a new title. In other embodiments, the original store information may be a part of the new store information, for example, when the original store information is a classification and a keyword of a product, the generated new store information is a product description.

In an embodiment, in step S2, before setting the corresponding variable vocabulary, the user first calls the setting interface of the variable vocabulary, and the access portal of the setting interface of the variable vocabulary is set in the interface of the application scenario of using the store information, so as to conveniently obtain the basic data of the original store information. For example, when creating product titles or descriptions for stores, the access portal of the variable vocabulary setting interface is set in the product list interface of the sales module, so that the operation personnel can quickly select the existing products in the product list interface and use the information of their original titles or descriptions to re-generate new titles or descriptions. When setting the variable vocabulary, it is possible to directly access the basic data of the store information, such as the product categories and some keywords, and to refer to the existing store information. When setting the variable vocabulary, it is possible to directly obtain basic data such as product categories, some keywords, and other store information, and add brief keyword information with reference to the existing store information, so as to improve the quality and efficiency of the work of setting the variable vocabulary. In other embodiments, there may be more than one access point to the variable vocabulary setting interface, such as setting the tool module connected to the AI system as an independent AI operation interface, and accessing the access point to the variable vocabulary setting interface from the AI operation interface, so as to minimize the user's operation steps.

In an embodiment, when the store information is a product title or a product description, the variable vocabulary setting interface includes one or more parameter setting boxes, the parameter boxes being used to set the corresponding variable vocabulary. The parameter box may be an edit box (to manually enter information), an option box (to select existing information content), or a borderless area preset for setting the relevant content (e.g., a borderless blank area preset to serve as a parameter setting box for the original title to be further imported into the original title). When the store information is a product title, you can add qualifying constraint terms in the question template, if the target language of the product title is English, qualify the title by adding the Arabic numeral 0 at the top of the title, in order to improve the probability of the product being retrieved in the sales segment of the e-commerce platform.

Further, in the relevant embodiment, the tool module, in addition to generating the corresponding store information through the AI system, may guide the AI system to learn the textual content and expression (expression format) of the existing store information (referring to the store information of the reference product, such as the store information of the competing product's title, description, keywords, and the like), summarize the selling points and keywords that the buyers therein are concerned about, and generate a brand-new five-point description. In generating the new store information of the target product based on the store information of the reference product, it can specifically include steps R1-R4 as follows.

Step R1: selects the site and ASIN of the reference product, and obtain the store information of the reference product through the AI system. The reference product may be a competing product that is already published on the e-commerce platform, and the store information of the corresponding reference product may be obtained through the site and ASIN number of the e-commerce platform; the store information of the reference product includes information such as the title, the description, keywords, and the evaluation of the product. In specific implementation, multiple ASIN can be entered at a site to enable the AI system to obtain store information for multiple reference products. In the present application, before the AI system completes each operation, a corresponding benchmark question is generated by the tool module.

Step R2: analyzes the ASIN of the reference product and extract the available words in the store information of the reference product. Available words include keywords such as high frequency words, common words, long tail words, and the articulation words of the description copy. Then learn how to write the description of the reference product, including learning the style and scene of the product description.

Step R3: determines the words (i.e., keywords) to be inserted when generating store information for the target product, including: (1) excluding irrelevant words; (2) evaluating the effectiveness of the words based on the search volume, conversion rate, and search growth rate; and (3) categorizing and sorting the words to form a thesaurus for the target product.

Step R4: generates a description of the target product through the AI system, including: (1) determining a description style of the target product based on the description style of the reference product; (2) determining the product attributes of the target product based on the product attributes of the reference product; (3) determining the selling points of the target product based on the selling points of the reference product; and (4) calling up the AI based on the description style of the target product, the product attributes, the selling points and the thesaurus system to generate the product description.

It is also possible to evaluate the effect of the description of the target product. Specifically, (1) estimating the effect and search ranking of buried search terms, (2) evaluating the position of buried search terms, and (3) evaluating the frequency of buried search terms; and evaluating the effect of the description of the target product based on the results of the above evaluation. Based on these steps, it realizes the rapid generation of new store information of target products on the basis of reference products, so that the style of store information of target products is close to that of reference products, and its corresponding keywords and descriptions can have good effect performance.

Figure 3:
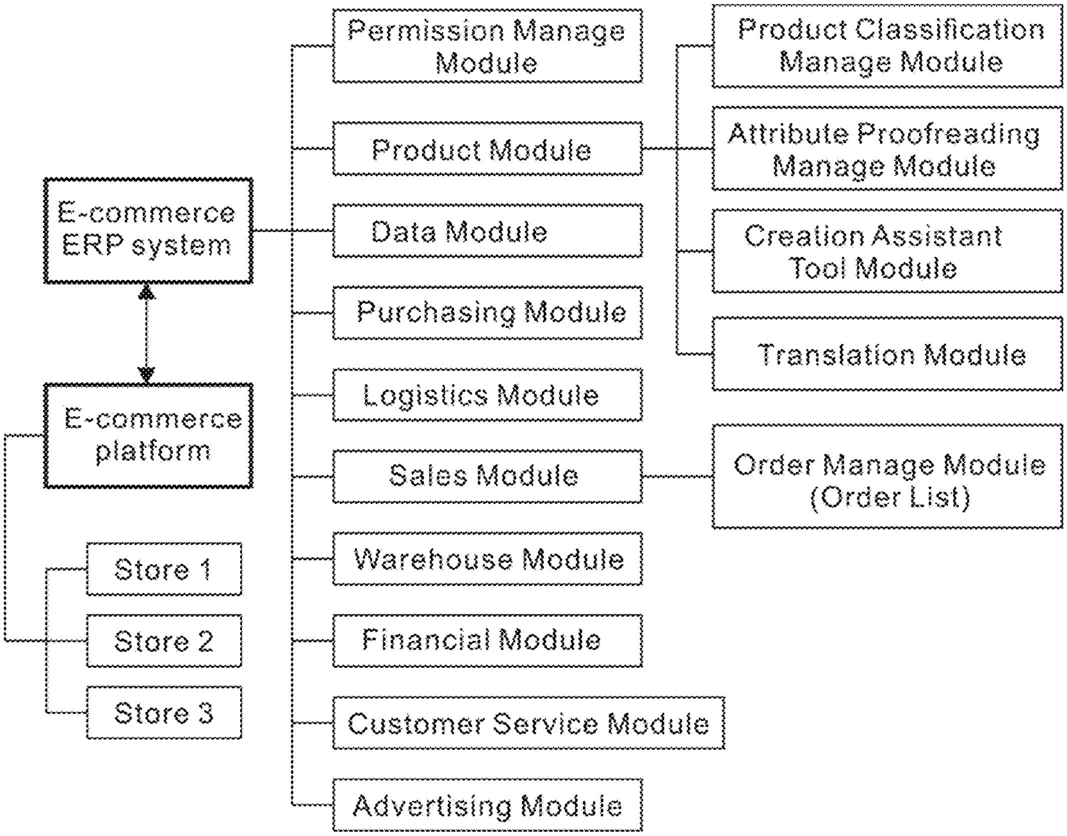
FIG. 3 shows a schematic diagram of the functional modules of the e-commerce ERP system in an embodiment of the present application.
Figure 4:
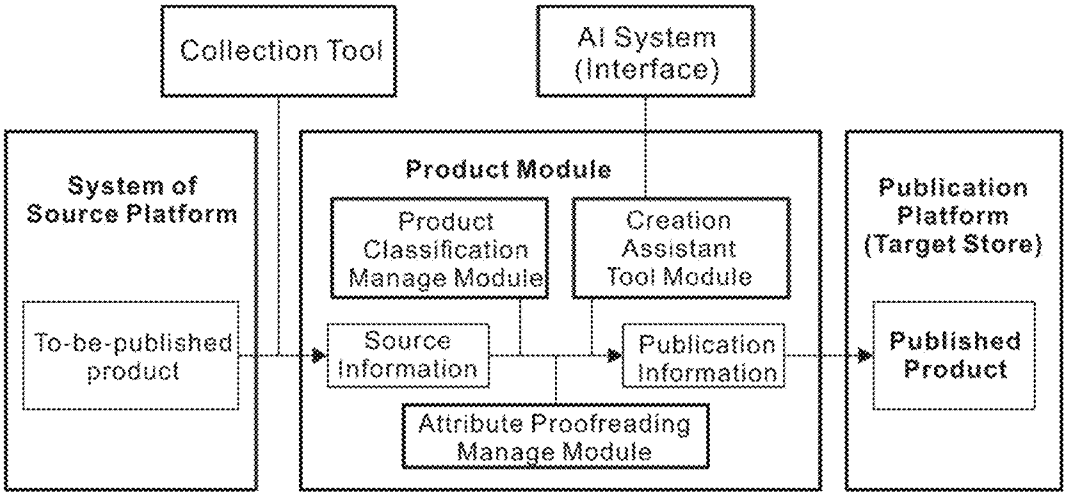
FIG. 4 shows a schematic diagram of the principle of the automatic publishing method of store products in an embodiment of the present application.
Figure 5:
FIG. 5 shows a schematic diagram of the flow of the automatic publishing method of store goods in an embodiment of the present application.

As shown in FIGS. 3-FIG. 5, the present application also provides an automatic method of posting store product for use in a product module of an e-commerce ERP or an e-commerce platform, characterized in that the product module comprises a product categorization management module and a creation assistant tool module, the product categorization management module comprises a categorization prediction tool, and the creation assistant tool module connects to an external AI system, and the AI system is a chatting based on a natural language processing technology robot, method comprising the following steps K1-K6.

Note: The store product release method of FIG. 3-FIG. 5 and the store information generation method of FIG. 1-FIG. 2 have similar technical solutions in terms of creating a benchmark question, calling up the AI system to generate new store information (i.e., store product information), etc., and the two can be referenced to each other in terms of program extensions, and the Creation Assistant Tool Module shown in FIG. 3 has the same functionality as the Tool Module shown in FIG. 1.

Step K1: collecting product information of the goods to be published from the source platform, defining collected product information as source information, and the source information being stored in the product module. Wherein the source information is collected from the sourcing platform by a collection tool, which may be an application plug-in that collects from a web page of the sourcing platform the corresponding product information of the to-be-published product, such as pictures, text, tables, videos, and other product information. Source platform refers to Alibaba platform system, Taobao Mall, Amazon and other online selling platform systems that provide sources of goods, the source platform and publication platform can be the same platform or different platforms, for example, in the Amazon product resale, the seller can collect the goods to be published from the B seller's B1 store on Amazon, and publish them to the A seller's A store on Amazon, at this time, both the source platform and the release platform is the Amazon platform.

Step K2: selecting a target store for publishing to-be-published product, defining the product information to be filled in by target store at the time of product publication as the publication information, defining the e-commerce platform under which the target store is located as the release platform; and setting the product publication rules of the target store. The target store is a store under the corresponding e-commerce platform, so the product module needs to obtain the data access rights of the target store before the product publication. The product publication rules are pre-configured with corresponding basic publication rules according to the requirements of different platforms, and the basic publication rules are used to convert the corresponding source information into publication information that meets the publication requirements of the platform. For example, the publishing requirements of a publishing platform require that the size of the picture information of the product publishing image is not less than L1×L2 (short side L1=800 pixels, long side L2=800 pixels), and the ratio is a (a=1:1), and the size of the picture information of the source is L3×L4 (short side L3=300 pixels, long side L4=400 pixels); at this time, it is judged that the size of the picture information of the source and the ratio do not meet the publishing requirements of the publishing platform, and it will not meet the publishing requirements of the publishing platform, so it is necessary to convert the corresponding source information into the publishing information. Do not meet the publication requirements of the publishing platform, at this time, the basic publishing rules can be: set up a blank picture of the published information according to the minimum size L1×L2, and then enlarge the picture of the source information to L3'×L4' in equal proportion, making L4'=L2, and then centering the enlarged picture of the source information filled into blank picture to obtain a picture of the goods that meets the publishing requirements of the publishing platform.

Step K3: setting up a product classification library in advance in the product classification management module, the classification prediction tool calculates the product classification of the to-be-published product based on the source information to obtain the product publication classification of the to-be-published product from product classification library; further obtaining the product publication attribute information of the to-be-published product based on the product publication classification of the to-be-published product; setting up the to-be-filled items (i.e., publication items) of publication information based on the release requirements of the platform, and identifying each of the to-be-filled items as a required release item or an optional release item based on the importance of the publication information. Setting the items to be filled in (i.e., publication items) of the publication information, and according to the degree of importance of each item to be filled in of the information, identifying each item to be filled in as a required release item or an optional release item. The product publication classification is a product classification set in the product module, not a product classification in the publish platform. Specifically, each product publication classification is configured with a corresponding product publication template, each product publication template is configured with a corresponding plurality of product publish items, and the product publication template contains a product attribute template and other publish items other than the product attribute items.

Wherein, the required release item refers to the classification item of the corresponding publication information that must be filled in when the product is published, the optional release item refers to the classification item of the corresponding publication information that can be selected to be filled in or not filled in when the product is published, and the to-be-published product can be published only after all of the required release item have been filled in, and each of the required release item or each of the optional release item includes the corresponding publication item name and publication item content. Further, the required release item and the optional release item of the product publication attribute information may be defined as required attribute items and optional attribute items respectively, so as to facilitate calibration of the required release item or the optional release item by the AI system at a later stage.

Step K4: extracting from source information product information of the same classification as the information classification of the item to be filled in of published information, then processing extracted source information according to product publication rules, and then filling processed source information (also including source information that does not need to be processed) into the item to be filled in of the corresponding published information.

For example, processing operations such as price adjustment processing of product price information, merging processing of product attributes, generating new SKU, etc. are performed according to the product publication rules, so as to avoid manual adjustment and modification of the publication information, improve the efficiency of the creation of the publication information, and realize the automatic creation of the publication information.

When matching the source information with the publication information or filling the source information into the publication information, the product publication title information, product publication price information, product publication image information, and product publication description information contained in the publication information corresponds to the product title information, product price information, product image information, and product description information of the source information.

Step K5: determining whether there is a lack of information in a required release item in publication information, and when there is no lack of information in the required publication item, determining that the publication information has been completed to be filled in, and proceeding to the operation of the next step; when there is a lack of information in required release item, the creation assistant tool module generates a benchmark question (i.e., a first benchmark question) based on the publish name of the required release item that has a lack of information, and then inputting benchmark question as questioning information to the AI system, and after the AI system generates corresponding product information based on questioning information, obtaining the product letter generated by the AI system and filling it into the corresponding required posting item in which there is a lack of information.

In specific embodiments, determining, one by one, whether there is missing information in the required release item in the publication information, calling the AI system one by one for each required release item with missing information to generate new product information, so as to make all of the required release item filled in completely, avoiding the mismatch between the source information and the publication information leading to the interruption of automatic publication of products, and thus improving the speed and accuracy of the creation of the publication information. In a related embodiment, when the AI system does not return the generated product information to the creation assistant tool module within a predetermined time T, then the required release item are set to the corresponding default values. In other implementations, the content of each product publication attribute information may be calibrated by the AI system based on a benchmark question for the generation of each product publication attribute information.

Step K6: Publishing the populated and completed publishing information in target store in accordance with the publishing rules of the platform where the target store is located.

Further, in step K3, a plurality of product publication categories are pre-set in the product classification library, and in setting product publication categories, the product publication categories are set to be the same as the product classifications of the respective publication platforms, or the product publication categories are set to be the product classifications attributed to the respective publication platforms. Before step K4, the source information is cleaned to remove duplicate, incomplete, or erroneous product information. In addition, the product module also includes a translation module, wherein the translation module automatically obtains the language type of target store and translates the publication information into the language of the target store.

The product publication rules include one or more sub-rules of the price calculation rules, attribute merging rules, SKU generation rules, inventory generation rules, and title generation rules, in addition to the basic release rules. Among them, the price calculation rule is used to convert the product price in the source information to the product publication price information in the publication information, and the rules for product price adjustment can be the rules for price adjustment operations such as setting the unit price of the product according to a fixed value, increasing the unit price of the product according to a percentage, and equalizing the freight cost. Attribute merging rules are used when converting the original variant information in the source information to the variant information in the publication information, including but not limited to setting the character length of the variant name, setting the variant name to adopt the original variant name in the source information, adding prefixes on the basis of the original variant name, adding suffixes on the basis of the original variant name, etc. The SKU generation rule is used to generate new SKU corresponding to the target store and the target store. SKU corresponding to the target store, including operations such as adding prefixes, suffixes or pre-qualified strings to the original SKU of the source information.

The inventory generation rule is used to set a fixed inventory quantity, and when the original inventory quantity of the source information is zero, the inventory quantity in the publication information adopts the changed fixed inventory quantity; when the original inventory quantity of the source information is not zero, the inventory quantity in the release information adopts the original inventory quantity in the source information. In other embodiments, the inventory generation rule includes a preset base inventory N1, and when the original inventory quantity of the source information is less than or equal to the base inventory N1, the inventory quantity in the publication information adopts the original inventory quantity in the source information; and when the original inventory quantity of the source information is greater than the base inventory N1, the inventory quantity in the publication information adopts the base inventory N1, so as to avoid excessive inventory of the product publication. The title generation rule is used to generate a new title in the publication information based on the original title of the source information by adding a prefix to the original title, adding a suffix, replacing part of the text in the original title with other fixed text or removing the text of the original title.

In addition, each sub-rule of the product publication rule has a default rule, and when the sub-rule is not set up with the conversion rule between the corresponding source information and the publication information, each sub-rule of the product publication rule adopts the default rule, which makes it possible to realize the automatic conversion of the source information and the publication information in the absence of the corresponding source information through the setting of the default rule and the preset value.

In an embodiment, the product release rule has a product release mode and a product price adjustment mode, and when set to the product publication mode, the source information is converted to the corresponding publication information according to the sub-rules of the product publication rule, so as to carry out the normal product publication operation; when set to the product price adjustment mode, only the price information of the source information is converted to the publication information, and other source information other than the price information is not converted, so as to realize the price adjustment operation of the store products through the automatic publication method of the store products of this application, and simplify the price adjustment operation of the published products. Information is not converted, thereby realizing the price adjustment operation of the store products through the automatic publication method of the store products of the present application and simplifying the price adjustment operation of the published products. In the Price Adjustment Mode, the settings of the required release item other than the product price information are adjusted to the optional release item.

In an embodiment, the product module further comprises a product publication list, storing one or more to-be-published products in product release list after being processed in steps K1-K5 (i.e., steps prior to step K6), and carrying out the publication operation of step K6 through product publication list. The product release list serves as an operation interface for product release, presenting the to-be-published product after processing in steps K1-K5 in the product publication list, facilitating the operation personnel to view and modify the product publication information, reducing the probability of operation error, and improving the quality of the creation of the product information as well as the user's interactive experience. In an embodiment, an automatic publication key can be set on the collection tool, and all publication operations of steps K1-K6 can be completed by clicking the automatic publication key.

After selecting one or more to-be-published products, you can perform batch publication, batch timed publication, batch modification of product price information in the source information, batch modification of product price information in the publication information, or batch deletion of to-be-published product on the selected to-be-published product through the product release list, so as to improve the efficiency of the operators in the management of to-be-published product.

In the relevant embodiment, the product publication list is pre-bound to one or more source platforms, the collection conditions of the to-be-published product are set, the collection conditions include the keywords of the to-be-published product (the keywords are also the words used to retrieve the products of the same or similar categories of the to-be-published product), the price range, the number of the to-be-published product to be collected, the sales ranking and other conditions of the to-be-published product, the product publication list automatically collects products that meet the collection conditions through a collection tool from the product publication list automatically collects the to-be-published product that meet the collection conditions from the source platform, and stores them in the product publication list after processing in steps K1-K5, thus realizing the batch collection and batch publication of to-be-published product and greatly improving the collection efficiency and publication efficiency of to-be-published product.

In step K5, the creating assistant tool module generates a benchmark question based on the publication name of information-missing required release item comprising: using the publication name of information-missing required release item, the product publication classification, the product publication title information, and the product publication attribute information for which the information is not missing as a variable vocabulary, and using the phrases connecting the variable vocabulary and the constraint phrases guiding the AI system to output the corresponding response content as a question template, and then generating a benchmark question based on variable vocabulary and question template. In a related embodiment, the creation assistant tool module comprises a plurality of question templates, and if the filling content of a certain variable vocabulary is missing, the question template is adjusted accordingly based on the variable vocabulary with the missing content, and automatically switches to another question template, and the switched question template connects to the remaining variable vocabulary without the missing content, so as to make the benchmark question more fluent.

For example, when publishing a shirt product, the missing required release item is the weight of the product, and the benchmark question can be "I want to publish a product of [xx classification], the title of the published product is [xx title], and the attribute information of the product is [xx attribute], but the missing item name of the product information is [xx publication item name]. But I am missing the item name [xx Posting Item Name] in the product information of this product. With reference to the above information, please help me obtain the information content of [xx publication item] from [XX platform] for the 10 closest products in the classification, and calculate the average value of the information content of these 10 obtained information content as the answer for the information content of [xx release item]. Provide only the answer to the information content of [xx publication item], do not provide explanations or other information." Where [xx release item name] is the weight of the product, [xx classification] is the classification of the product release, [xx title] is the title information of the product publication, [xx attribute] is the attribute information of the product publication where the information is not missing, and [XX platform] can be the specified sourcing platform, publication platform, or other e-commerce platform. The content inside the brackets is the variable vocabulary, and the content outside the brackets is the question template, which together constitute the benchmark question; in the specific operation, the creation assistant tool obtains the field name (i.e., the name of the publication item corresponding to the publication information) and the field parameter (i.e., the content of the publication item corresponding to the publication information) of the corresponding variable vocabulary, in order to complete the automatic creation of the benchmark question. Further, the AI system obtains from an external e-commerce platform (meaning a sourcing platform, a publishing platform, or other e-commerce platform) a plurality of products of the same classification as to-be-published product, and extracts the information content of plurality of products corresponding to required publication items. In generating a benchmark question, determining the type of missing required information release item: when missing required information release item is a numeric required item, benchmark question limits AI system to take the average value of the information content of plurality of products corresponding to the required release item as the generated content of AI system (the generated content is product information); when missing required information release item is a non-numeric required item, benchmark question limits AI system to take the average value of the information content of plurality of products corresponding to the required release item as the generated content of AI system. When required item of missing information is a non-numeric required item, benchmark question limits AI system to take the information content with the highest number of repetitions among the information content of plurality of required items corresponding to products as the generated content of AI system. Numeric required items refer to required items whose fill-in parameters are numeric, including weight, size, price, power, life and other items. Non-numeric required items are required items whose fill-in parameters are non-numeric, including items such as color, material, style, and so on.

For example, when publishing a shirt product, the required publishing item with missing information is the style, the AI system obtains the material information content of 10 similar types of shirts from external e-commerce platforms, of which 6 shirt styles are business formal, 3 shirt styles are business casual, and 1 shirt style is simple and casual, then the AI system takes the business formal with the most repetitive times in the style as the Generated content.

In an embodiment, after step K4, the creation assistant tool module generates a second benchmark question according to the product publication title information and the product release attribute information; the second benchmark question defines that the AI system embellishes the content of the product release title information according to the product release attribute information, the AI system generates new product release title information according to the second benchmark question, and the new product release title information is used for the release of the to-be-published product. The creation assistant tool module generates a third benchmark question according to the product publication description information and the product release attribute information, the third benchmark question defines that the AI system embellishes the content of the product publication description information according to the product release attribute information, the AI system generates new product publication description information according to the third benchmark question, and the new product publication description information is used for the release of the to-be-published product. Thereby, the product publication title information and the product publication description information are superior to the product title and the product description of the source information.

In an embodiment, the product module further includes a product attribute calibration module. When creating the product information of the to-be-published product, it counts the number of required release items M1 and the number of optional release item M2 of the publication information, and counts the number of times M3 that the AI system is called to generate required items when there is a lack of information in the required release items, and when the ratio of M3 to M1 is greater than a predetermined ratio M4, the product attribute calibration module records the corresponding product publication classification of the to-be-published product and prompts the system maintainer of the product module to calibrate the product publication classification and its corresponding product publication attribute information of each item to be filled, and upgrades the product classification library in a timely manner. The system maintenance personnel will calibrate the items to be filled in for the product publication classification and its corresponding product publication attribute information, so as to upgrade the product classification library in a timely manner.

In an embodiment, the product classification library further includes a product attribute claim list, and the product attribute calibration module adds the names of the product attributes that have not been successfully populated into the corresponding publication information to be filled in step K4 to the product attribute claim list of the product classification library and identifies the corresponding product publication classification for the operation personnel or the system maintenance personnel of the product module to further calibrate and claim the corresponding names of the product attributes in order to Improve the product attribute classification of each product publication classification.

In an embodiment, the product module identifies whether the product publication description information contains product price information based on one or more preset currency units (such as yuan, dollar, pound, ¥, $, £, and other currency units or currency units conforming to), and suspends the product publication when the product publication description information contains the preset currency units, stores the to-be-published product in the product release list, and identifies that the creation of the product release information was incomplete The product will be stored in the product publication list, and the product publication information will be labeled as incomplete, which makes it easier for the operation personnel or the system maintenance personnel of the product module to find out the reason for the failure.

Figure 6:
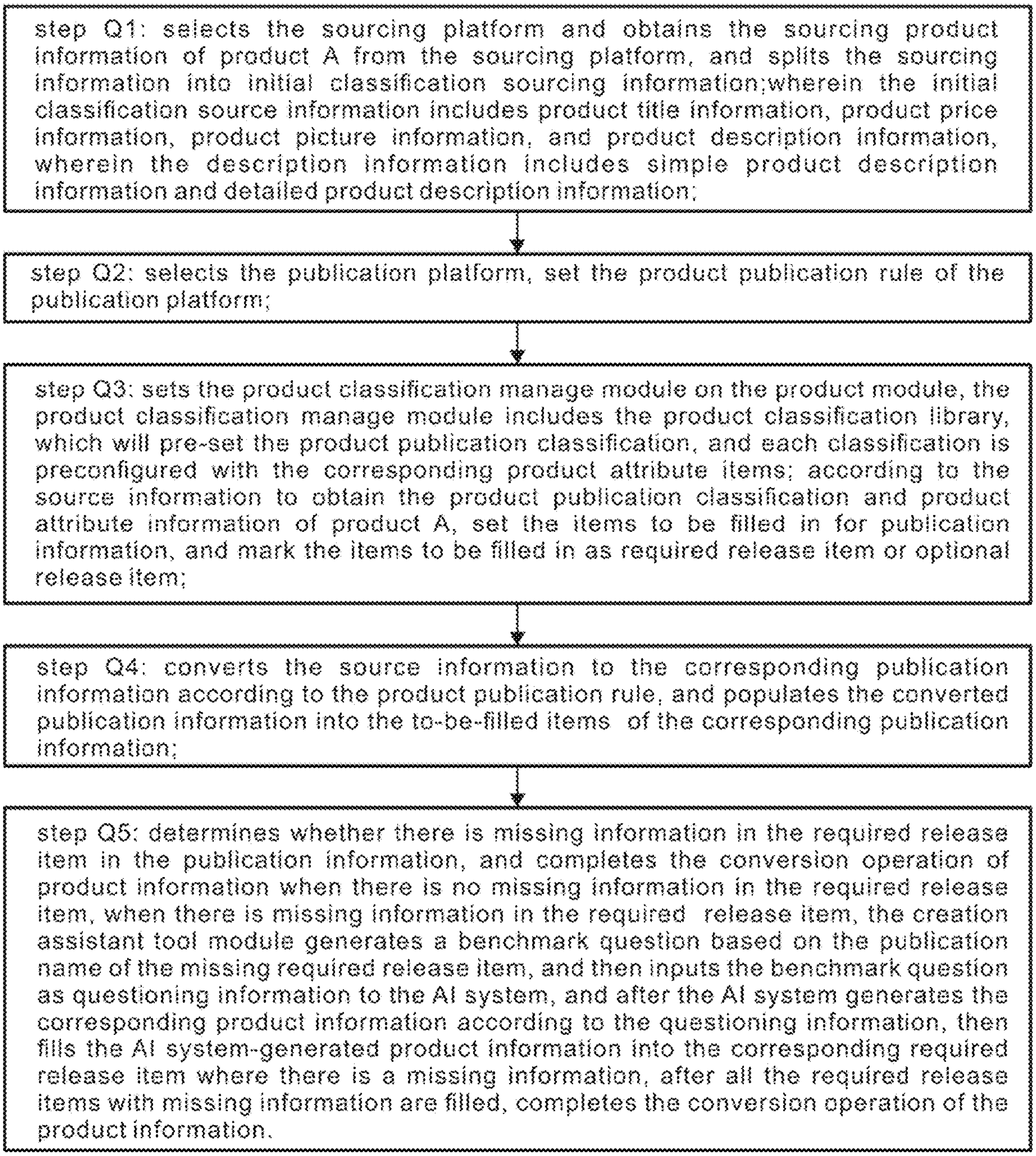
FIG. 6 shows a schematic diagram of the flow of the multi-platform product information conversion method in an embodiment of the present application.

As shown in FIG. 6, the present application also provides a multi-platform product information conversion method for a product module of an e-commerce ERP or an e-commerce platform to convert the source information of a sourcing platform (the first platform) to the publishing information of a publishing platform (the second platform), product module comprising a creation assistant tool module connecting to an external AI system, and is characterized in that the method comprises the following steps Q1-Q5.

Description: Steps Q1-Q5 correspond to steps K1-K5 of the automatic release method of store product, respectively, and can be used for product release when it is product information conversion, and can also be used for storing source information, store moving, and other operations to improve the matching accuracy of the product information. Wherein the source platform in steps Q1-Q5 refers generally to the e-commerce platform before the conversion of the product information, and the release platform refers generally to the e-commerce platform after the conversion of the product information.

Step Q1: obtains from the source platform the source information of product A (product A refers to a product in general, which may be a product to be published), split the source information into initial classification source information, initial classification source information includes product title information, product price information, product picture information and product description information.

Step Q2: selects the publishing platform and set the product publishing rules of the publishing platform. In practical application, selecting the target store of the publishing platform is equivalent to selecting the publishing platform.

Step Q3: setting up a product classification management module on the product module, product classification management module includes a product classification library, product classification library is pre-provisioned with product release categories, and each product release classification is pre-provisioned with corresponding product attribute items; obtaining the product release classification and product release attribute information of the product A according to the source information, setting up the items to be filled in for the release information and marking each item to be filled in as a required release item or an optional release item. The items to be filled in are set, and each item to be filled in is identified as a required item or an optional item.

Step Q4: converts source information into corresponding release information according to product release rules, and populate the converted release information into the to-be-filled items of the corresponding release information.

Step Q5: determining whether there is information missing in the required release items in the release information, when there is no information missing in the required release items, completing the conversion operation of the product information; when there is information missing in the required release items, the creation assistant tool module generates a benchmark question based on the release name of the required release items with information missing, and then inputs the benchmark question as the questioning information to the AI After the AI system generates corresponding product information based on questioning information, the product information generated by AI system is then filled into the corresponding required release items with missing information, and after all the required release items with missing information are filled, the conversion operation of product information is completed.

In step Q3, the product classification management module includes a classification prediction tool, the product publication classification of the product classification library has a plurality of levels; the product publication classification of each level includes a product classification (also known as a name of the product classification) and an identification text, and the classification prediction tool performs a product classification calculation of the product A in accordance with identification text and source information in order to obtain the product release of the product A from product classification library classification. The identification text is a fixed word for matching and identifying a corresponding product classification, and each product classification has a corresponding one or more identification texts. For example, the product classification library has a product classification of "clothing" and a sub-level product classification of "suit", and "clothing" may include "clothes", "tops", "shirt", "trousers", "socks", "hat", "coat", "suit" and so on more than one logo text. The "suit" can only use its own product classification "suit" as the logo text, that is, there is only one logo text, you can use the name of each product classification as the logo text of the corresponding product publication classification.

Further, in step Q3 the product categorization calculation comprises steps Q31-steps Q34.

Step Q31: extracting title information for source information.

Step Q32: extracting logo text one by one from a product classification library, and determining whether extracted logo text and product title information are successfully matched, if the product title information contains the logo text, then determining that the logo text and the product title are successfully matched, otherwise the matching is unsuccessful; and counting the number G of successfully matched logo text.

Step Q33: make a preliminary judgment of product publication classification according to the value of G: when G=0, stop product classification calculation, and product module prompts the operator to specify the corresponding product publication classification from a product classification library and update the product classification library (such as by adding a new product publication classification or by adding a new logo text to the original product publication classification); when G=1, take the successfully matched identification text corresponding to the product publication classification as the product publication classification of the product A; when G≥2, the operation of the next step is carried out.

Step Q34: determine whether each successfully matched logo text corresponds to the same product publication classification; when each successfully matched logo text corresponds to the same product publication classification, take same product publication classification as the product publication classification of the product A; when each successfully matched logo text corresponds to a different product publication classification, take the product publication classification with the lowest hierarchy as the product publication classification of the product A.

For example, the title of a product A is "Professional Suit Boutique Men's Clothing", the product classification library of the product publication classification includes "Clothing" and "Suit" two levels of product publication classification, "Suit" product classification is lower than the level of "Clothing" product classification, "Clothing" product publication classification logo text includes "Clothing" product publication classification. Classification, "suit" product classification level is lower than the level of "clothing" product classification, "clothing" product publication classification logo text include "Clothing" and "Suit" includes "Suit"; then according to the calculation of product classification, G=2, and "Suit" with the lowest level is taken as product A's product. "Suit" is taken as the product publication classification of product A.

This product classification calculation method can quickly obtain more accurate product publication categories, and can be based on the operation verification of millions of users on the e-commerce ERP, by constantly adding new product publication categories or adding new logo text in the original product publication categories, to build a product classification library compatible with various e-commerce platforms, thus significantly improving the accuracy of data matching of product information on different e-commerce platforms; combined with the corresponding product module or system, it can realize the data conversion of product information from any source platform to any publication platform, or the conversion of product information between any publication platforms. The corresponding product module or system can realize the data conversion of product information of any source platform and product information of any publication platform, or the conversion of product information between any publication platforms.

The above is only a preferred embodiment of the present application, and is not intended to limit the patent scope of the present application, and any equivalent transformations made under the inventive concept of the present application, utilizing the contents of the specification of the present application and the accompanying drawings, or directly/indirectly applying them in other related technical fields are included in the scope of patent protection of the present application.

What is claimed is:

1. An automatic publication method of store products, for a product module of an e-commerce ERP, the product module includes a product classification management module and a creation assistant tool module, the product classification management module includes a classification prediction tool, and the creation assistant tool module connects with an external AI system, and the method comprises:

step K1: collecting product information of a to-be-published product from a source platform, and defining the collected product information as source information;

step K2: selecting a target store for publishing the to-be-published product, defining product information of the to-be-published product to be filled in the target store at time of product publication as publication information, and defining an e-commerce platform where the target store is located as a publication platform; setting a product publication rule for the target store;

step K3: pre-setting a product classification library in the product classification management module, the classification prediction tool performs product classification calculation of the to-be-published product based on source information, to obtain a product publication classification of the to-be-published product from the product classification library; further obtaining product release attribute information of the to-be-published product based on the product publication classification; setting to-be-filled items of the publication information and identifying each of the to-be-filled items as required release item or optional release item;

step K4: extracting product information from the source information with the same information classification as the to-be-filled items of the publication information, and then processing the extracted product information from source information according to the product publication rule, and then filling the processed extracted product information from source information into to-be-filled items of corresponding publication information;

step K5: determining whether there is missing information in the required release item of the publication information, performing the operation of step K6 after determining there is no missing information in the required release item; generating, after determining that there is missing information in the required release item, a first benchmark question based on a publication name of the required release item missing the information, and then inputting the first benchmark question as a questioning information to the AI system, after the AI system generates corresponding product information according to the questioning information, filling the corresponding product information generated by the AI system into the required release item missing the information; and step K6: publishing completed publication information into the target store;

wherein the product publication rule comprises a price calculation rule, an attribute merging rule and a SKU generation rule, the price calculation rule converts product price of the source information into product publication price information of the publication information, the attribute merging rule is a variant information merging rule adopted when original variant information of the source information is converted into variant information of the publication information, the SKU generation rule generates new SKU corresponding to the target store;

wherein filling the processed source information into the to-be-filled items of the publication information, a product publication title information, product publication price information, product publication image information, and product publication description information contained in the publication information from the to-be-filled items corresponds to a product title information, product price information, product image information, and product description information of the source information;

wherein the creation assistant tool module generates a first benchmark question based on the publication name of the required release item missing the information, including:

taking the publication name of the required release item missing the information, the product publication classification, a product release title and product release attribute information without missing information in the required release item as variable vocabularies, terms linking variable vocabulary and constraint terms guiding the AI system to output corresponding response content are used as a question template, and then generating the first benchmark question according to the variable vocabulary and the question template;

wherein the creation assistant tool module generates a second benchmark question according to product publication title information and the product release attribute information; the second benchmark question defines that the AI system refines content of product release title information according to the product release attribute information, the AI system generates new product release title information according to the second benchmark question, and the new product release title information is used for release of the to-be-published product;

wherein the creation assistant tool module generates a third benchmark question according to product publication description information and the product release attribute information, the third benchmark question defines that the AI system refines content of the product publication description information according to the product release attribute information, the AI system generates new product publication description information according to the third benchmark question, and the new product publication description information is used for the release of the to-be-published product;

the product classification library is a collection of product classifications that are independent of e-commerce platforms, and the product publication classification of the product classification library has a plurality of levels, each level of the product publication classification includes a product classification and an identification text, and the classification prediction tool performs the product classification calculation of the to-be-published product in accordance with the identification text and the source information in order to obtain the product publication classification of the to-be-published product from the product classification library.

2. The method according to claim 1, wherein, in step K3, a pre-setting of a plurality of product publication classifications in the product classification library, and when pre-setting the plurality of product publication classifications, the product publication classifications are set to be the same as a product classifications of respective publication platforms, or the product publication classifications are set to be attributed to the product classifications of the respective publication platforms;

and/or, before step K4, cleaning of the source information to remove duplicate, incomplete or erroneous product information;

and/or, the product module further comprises a translation module, the translation module automatically obtains language of the target store and translates the publication information into the language of the target store;

and/or, the AI system is a chatbot based on natural language processing technology.

3. The method according to claim 2, wherein sub-rules of the product publication rule have default rules, and the sub-rules of the product publication rule adopt the default rules when the sub-rules do not set a conversion rule between corresponding source information and the publication information.

4. The method according to claim 3, wherein the product publication rule has a product publication mode and a product price adjustment mode, when the product publication rule is set to the product publication mode, the source information will be converted into the corresponding publication information according to each sub-rule of the product publication rule, when the product publication rule is set to the product price adjustment mode, only the product price information of the source information is converted into the publication information, and other source information besides the product price information is not converted.

5. The method according to claim 1, wherein the product module also includes a product publishing list, one or more to-be-published products are saved in the product publishing list after being processed by steps K1-K5, and the product publishing list is used for publishing step K6.

6. The method according to claim 5, wherein, after selecting one or more to-be-published products through the product publishing list, the following operations are performed on the selected one or more to-be-published products: batch publication, batch timed publication, batch modification of product price information in the source information, batch modification of product price information in the publication information, or batch deletion of to-be-published product;

and/or, the product publishing list is pre-bound to one or more source platform and sets collecting conditions of the to-be-published product, the collecting conditions include keywords of the to-be-published product, a price range, the product publishing list automatically collects the product from the one or more source platform through a collection tool, and after processing by steps K1-K5, the to-be-published product is saved in the product publishing list.

7. The method according to claim 1, wherein the AI system obtains products of the same product publication classification as the to-be-published product from an external e-commerce platform, and collects information of required release items corresponding to the obtained products;

when generating a benchmark question, the AI system judges a type of the required release item missing the information: when the required release item missing the information is digital class required release item, the benchmark question defines that an average value of the information content of the required release items corresponding to the obtained products taken by the AI system as the generated corresponding product information of the AI system; when the required release item missing the information is not digital class required release item, the benchmark question defines that the AI system takes information content that is most repeated in the information content of the required release items corresponding to the obtained products as the generating corresponding product information of the AI system.

8. An automatic publication system of store products, comprising a processor, wherein the system is an e-commerce ERP or e-commerce platform, the system comprising a product module, the processor executes operation instructions contained the method in claim 1.

* * * * *